(12) United States Patent
Bey

(10) Patent No.: US 8,322,373 B2
(45) Date of Patent: Dec. 4, 2012

(54) AXIAL DRAG VALVE WITH INTERNAL SLEEVE ACTUATOR

(75) Inventor: Roger Bey, Rossignols (FR)

(73) Assignee: Control Components, Inc., Rancho Santa Margarita, CA (US)

( * ) Notice: Subject to any disclaimer, the term of this patent is extended or adjusted under 35 U.S.C. 154(b) by 770 days.

(21) Appl. No.: 12/123,218

(22) Filed: May 19, 2008
(Under 37 CFR 1.47)

(65) Prior Publication Data
US 2009/0283709 A1 Nov. 19, 2009

(51) Int. Cl.
*F16K 1/12* (2006.01)
(52) U.S. Cl. ............... 137/625.38; 251/325; 251/344
(58) Field of Classification Search .............. 251/324, 251/325, 343, 344, 345; 137/625.38
See application file for complete search history.

(56) References Cited

U.S. PATENT DOCUMENTS

| | | | | |
|---|---|---|---|---|
| 3,227,179 | A | * | 1/1966 | Rosaen ............... 137/625.61 |
| 3,590,848 | A | * | 7/1971 | Svensson .............. 137/116.3 |
| 3,654,950 | A | * | 4/1972 | Hamm ................... 137/219 |
| 3,964,516 | A | | 6/1976 | Purton et al. |
| 3,990,475 | A | * | 11/1976 | Myers ................... 137/625.3 |
| 4,167,262 | A | * | 9/1979 | Lemmon ................ 251/25 |
| 4,244,388 | A | | 1/1981 | Feiss |
| 4,565,210 | A | * | 1/1986 | Heine et al. ............ 137/219 |
| 4,928,733 | A | | 5/1990 | Sudolnik et al. |
| 5,226,444 | A | * | 7/1993 | Nagpal et al. ............ 137/488 |
| 5,435,336 | A | | 7/1995 | Serot |
| 5,964,248 | A | | 10/1999 | Enarson et al. |
| 6,328,277 | B1 | * | 12/2001 | Hanada .................. 251/61 |
| 6,361,018 | B2 | * | 3/2002 | Roth et al. .............. 251/129.2 |
| 6,394,134 | B1 | * | 5/2002 | Kwon ................... 137/625.3 |
| 6,568,717 | B1 | | 5/2003 | Le Clinche |
| 6,733,000 | B2 | | 5/2004 | McCarty et al. |
| 6,817,416 | B2 | * | 11/2004 | Wilson et al. .............. 166/332.1 |
| 6,874,761 | B2 | | 4/2005 | McCarty et al. |
| 6,923,428 | B2 | | 8/2005 | Quere et al. |
| 6,926,032 | B2 | | 8/2005 | Nawaz |
| 6,929,245 | B2 | | 8/2005 | McCarty et al. |
| 7,066,447 | B2 | | 6/2006 | McCarty et al. |
| 7,178,785 | B2 | | 2/2007 | McCarty et al. |
| 2001/0007264 | A1 | | 7/2001 | McCulloch |
| 2003/0192601 | A1 | | 10/2003 | Baumann |

(Continued)

FOREIGN PATENT DOCUMENTS

GB 316386 8/1929

(Continued)

OTHER PUBLICATIONS

Search Report and Written Opinion for PCT/US2009/044225.

(Continued)

*Primary Examiner* — John Bastianelli
(74) *Attorney, Agent, or Firm* — Stetina Brunda Garred & Brucker

(57) ABSTRACT

In accordance with the present invention, there is provided an axial drag control valve which includes an internal disk stack trim and an internal actuator. The fluid inlet and outlet of the valve are disclosed along a common axis, which is further shared with the actuator of the valve. The actuator moves along this particular axis to control the fluid flow rate, pressure, or temperature of the system. The valve actuator may be powered by air from an external source.

18 Claims, 7 Drawing Sheets

U.S. PATENT DOCUMENTS

| | | | |
|---|---|---|---|
| 2004/0183044 A1* | 9/2004 | Wears | 251/206 |
| 2005/0098755 A1* | 5/2005 | Kussel | 251/324 |
| 2006/0011236 A1* | 1/2006 | Suter et al. | 137/375 |

FOREIGN PATENT DOCUMENTS

| | | |
|---|---|---|
| GB | 2054103 | 2/1981 |
| JP | 58184381 | 10/1983 |
| WO | WO0004426 | 1/2000 |
| WO | WO0009923 | 2/2000 |
| WO | WO2005103542 | 11/2005 |

OTHER PUBLICATIONS

Mokveld Valves Bv, "Axial Control Valve Product Summary Sheet," The Netherlands.

Mokveld Valves Bv, "Axial Surge Relief Valve Product Summary Sheet," The Netherlands.

Dresser Flow Solutions, Becker Operations "Becker Series CV & 41005 Natural Gas Globe Valve Regulator," Elk Grove, Illinois, USA.

Dresser Flow Solutions, Becker Operations "RPDA Series Rotary Piston Double Acting Actuators," Elk Grove, Illinois, USA.

Legris Connectic "Piloted Axial Valve," mdmetric.com.

SPX Process Equipment, "M&J Valve—The Danflo Family of Control Valves," Houston, Texas.

RMG, "Flow Control Valve RMG 530," Germany.

CMB Industries, "Baily PolyJet Valves," Fresno, California.

CMB Industries, "PolyJet Control Valves," Fresno, California.

Balluff, "Micropulse Ex TA12" www.balluff.com.

The Wolf Safety Lamp Company, Ltd., "Wolflite Handlamp," product label, England.

VDMA Valves, "ATEX Guidelines for the Valve Industry," Germany.

Kuhme Armaturen, "Axialventil Typ AX," Germany.

\* cited by examiner

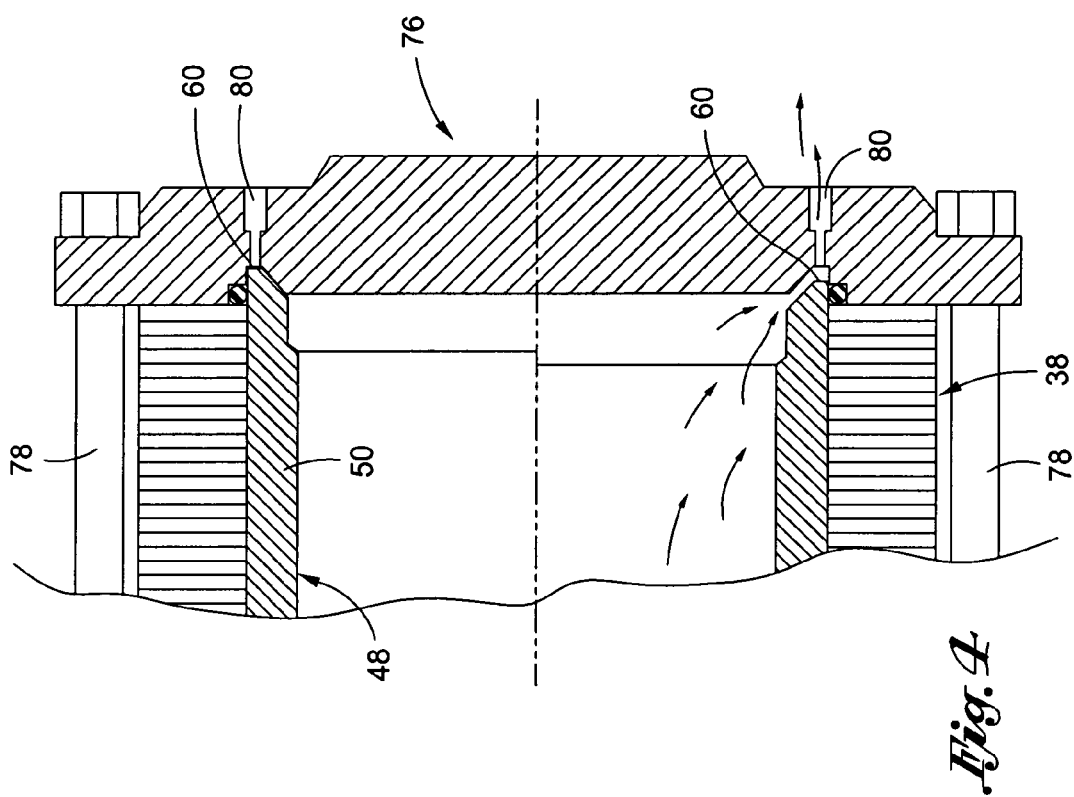
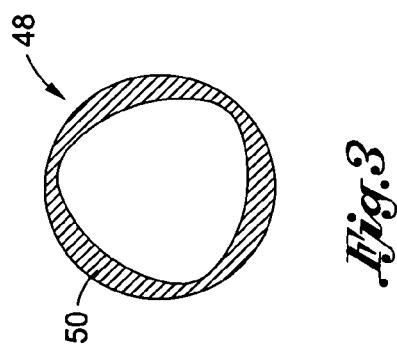

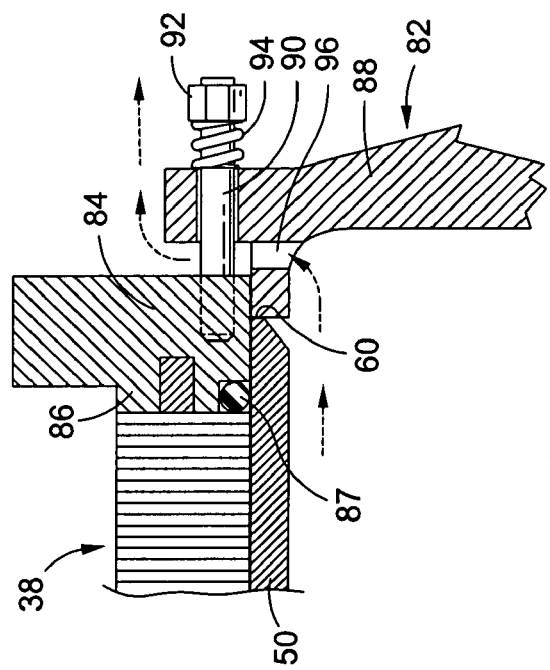
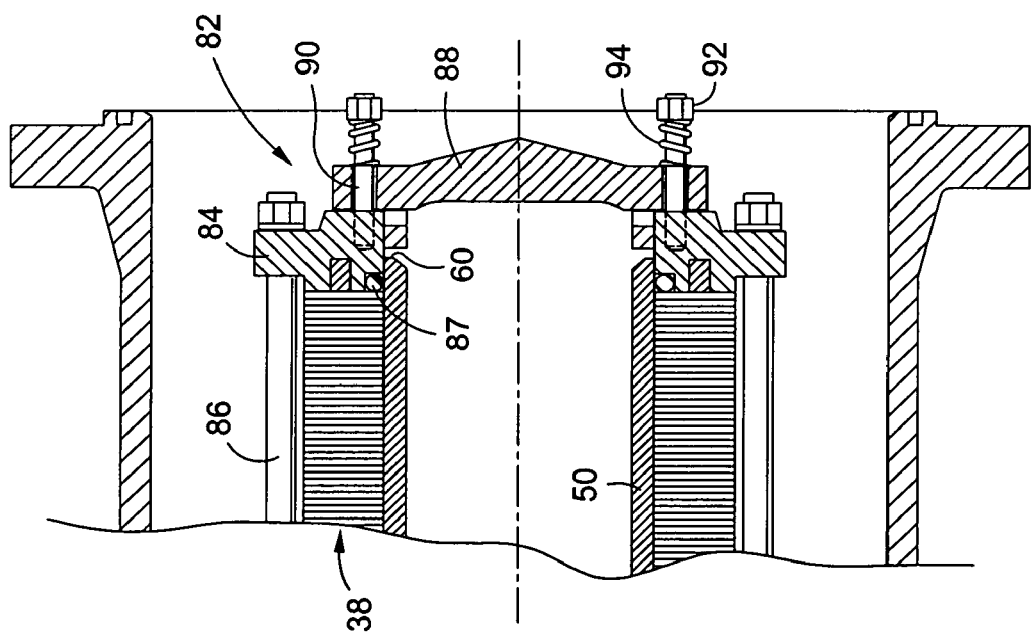

AXIAL DRAG VALVE WITH INTERNAL SLEEVE ACTUATOR

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

1. Field of the Invention

The present invention relates generally to control valves, and more particularly to an axial control valve product that provides high capacity and low noise performance characteristics.

2. Description of the Related Art

As is known in the control valve industry, three well known types of conventional fluid valves include rotary stem valves, sliding stem valves, and sleeve valves. Rotary stem valves generally comprise a rotary shaft or stem which is maintained within a valve body. The rotation of the shaft may be used to facilitate the alignment of a radial port of the shaft with a fluid port of the valve body to open a valve passage. Conversely, the rotation of the shaft may facilitate a misalignment of the ports to effectively close the valve passage. In operation, a typical rotary valve shaft or stem must rotate about 90° relative to the valve body between the fully open and closed positions. There exists in the prior art other types of rotary valve designs which utilize alternative geometries requiring a shaft rotation that is less than 90°, such as three way or angled ball valves.

Rotary valves typically employ the use of seals, and often bearings, which are disposed between the rotary shaft and the valve body to prevent fluid from leaking from the valve body between the shaft and the valve body. In this regard, one of the primary drawbacks of rotary valves is that the significant movement of the shaft typically causes substantial wear to the seals and, if present, the bearings. Thus, the bearings and seals of a rotary valve must typically be replaced over time. Another drawback is that the seals, in order to function properly, also add friction between the valve body and the shaft. Substantial force is therefore typically necessary to overcome the seal friction and rotate the shaft.

A sliding stem valve typically operates on a principle similar to a piston, and includes a valve plug on a stem that slides linearly within a valve body. The valve plug bears against a seat or closes a passage when moved to a closed position, and is spaced from the seat or clears the passage when moved to an open position. The valve stem and the valve plug must usually move relative to the valve body a significant distance between the fully open and closed positions. Like rotary stem valves, sliding stem valves typically employ seals, and often guides, between the stem and the valve body to prevent fluid from leaking from the valve body between the stem and the valve body. In this regard, one of the primary drawbacks of sliding stem valves is that the significant linear movement of the stem causes wear on the seals, thus often necessitating that the seals be replaced over time. Another drawback is that the seals also create friction that must be overcome in order to move the linear stem valve between its open and closed positions.

Sleeve valves typically have a valve body defining an axial fluid flow passage. A stationary valve plug is usually fixed within the valve passage and carries or defines a valve seat positioned on an upstream end of the plug. A slideable valve sleeve is positioned in the valve passage and can be selectively moved between a fully closed position with a downstream end of the sleeve bearing against the valve seat, and a fully opened position with the downstream end of the sleeve being spaced a prescribed distance from the valve seat. Fluid can flow through the valve passage and the sleeve, around the valve plug, and an exit outlet of the valve.

Sleeve valves as known in the prior art typically have a number of prescribed performance characteristics, such as fluid flow rate, fluid pressure, valve flow coefficient, as well as inherent, installed, and linear flow characteristics. Various flow characteristics of sleeve valves can typically be determined or controlled by a number of factors, including the size and shape or contour of the upstream end of the valve plug, the shape of the plug body beyond or downstream of the upstream end, and the passageway or orifice size and contour surrounding the valve plug. Other valve features can be designed and shaped to affect valve flow or performance characteristics as well, including contours of the valve sleeve outlet opening or the like. Along these lines, designing a particular valve plug shape is an often used means to achieve a desired valve performance or flow characteristic. However, as a result, a typical sleeve valve for a given system often has a unique, non-replaceable valve sleeve and plug. Thus, if a different valve flow characteristic is desired for a particular valve or system, or if a valve seat or plug is damaged within a valve or system, it is often necessary to remove and replace the entire valve assembly within the system. In this regard, to change the load characteristics or the valve plug, it has typically been necessary in the prior art to swap the entire sleeve valve with a newer replacement valve.

The axial drag valve constructed in accordance with the present invention is adapted to overcome many of the deficiencies highlighted above in relation to known rotary, sliding stem, and sleeve valve designs. Various novel features of the present invention will be discussed in more detail below.

BRIEF SUMMARY OF THE INVENTION

In accordance with the present invention, there is provided multiple embodiments of an axial drag control valve which includes an internal disk stack trim and an internal actuator. The fluid inlet and outlet of the valve are disposed along a common axis, which is further shared with the actuator of the valve. The actuator moves along this particular axis to control the fluid flow rate, pressure, or temperature of the system. In exemplary embodiments of the present invention, the valve actuator may be powered by air from an external source.

The present invention is best understood by reference to the following detailed description when read in conjunction with the accompanying drawings.

BRIEF DESCRIPTION OF THE DRAWINGS

These, as well as other features of the present invention, will become more apparent upon reference to the drawings wherein:

FIG. 3 is a cross-sectional view taken along line 3-3 of FIG. 1;

FIG. 4 is a partial, cross-sectional view of a first potential variant of the axial drag valve of the first embodiment shown in FIGS. 1 and 2;

FIG. 5 is a partial, cross-sectional view of a second potential variant of the axial drag valve of the first embodiment shown in FIGS. 1 and 2;

FIG. 6 is an enlargement of the encircled region 6 shown in FIG. 5;

Common reference numerals are used throughout the drawings and detailed description to indicate like elements.

DETAILED DESCRIPTION OF THE INVENTION

Figure 1:
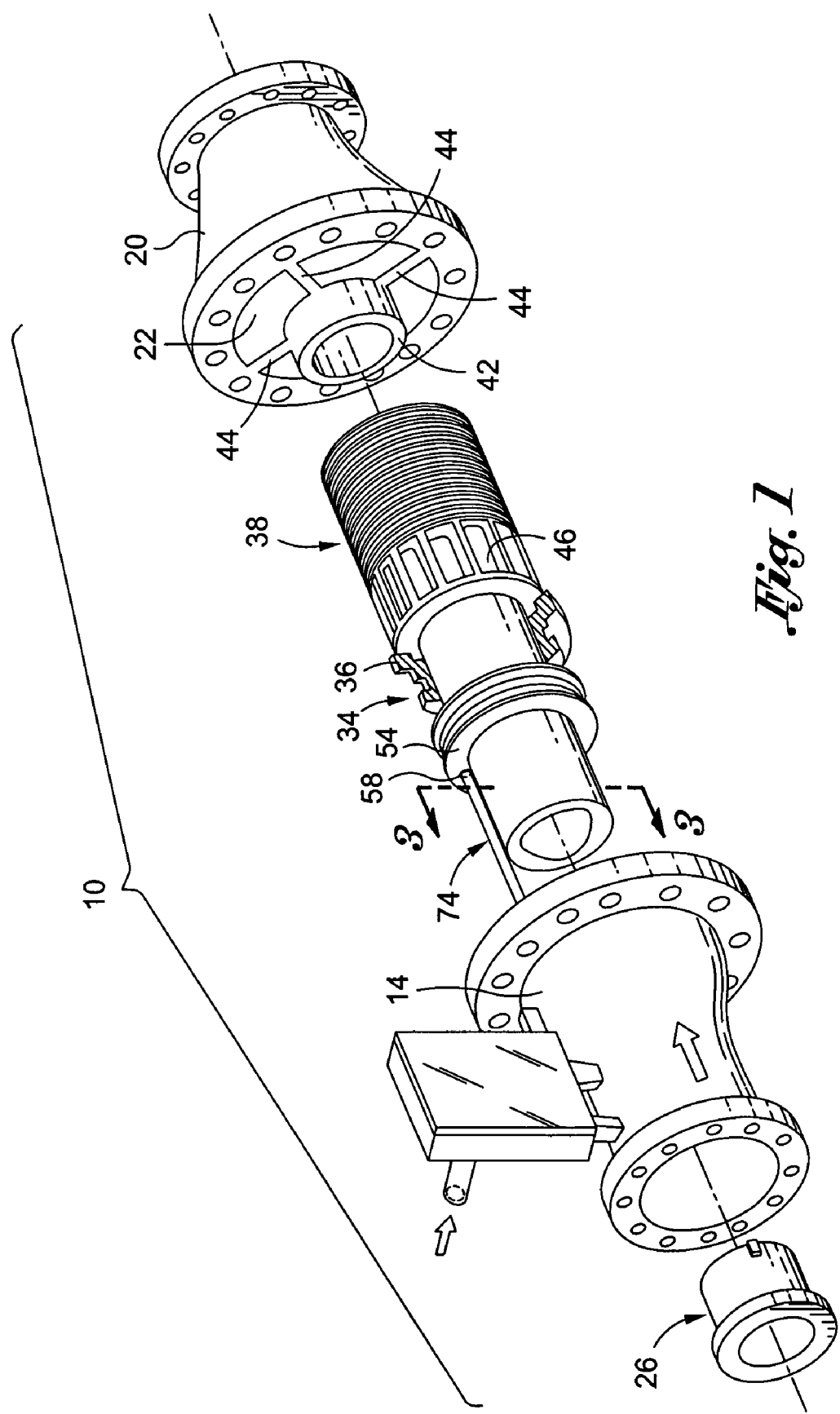
FIG. 1 is an exploded view of an axial drag valve constructed in accordance with a first embodiment of the present invention.
Figure 2:
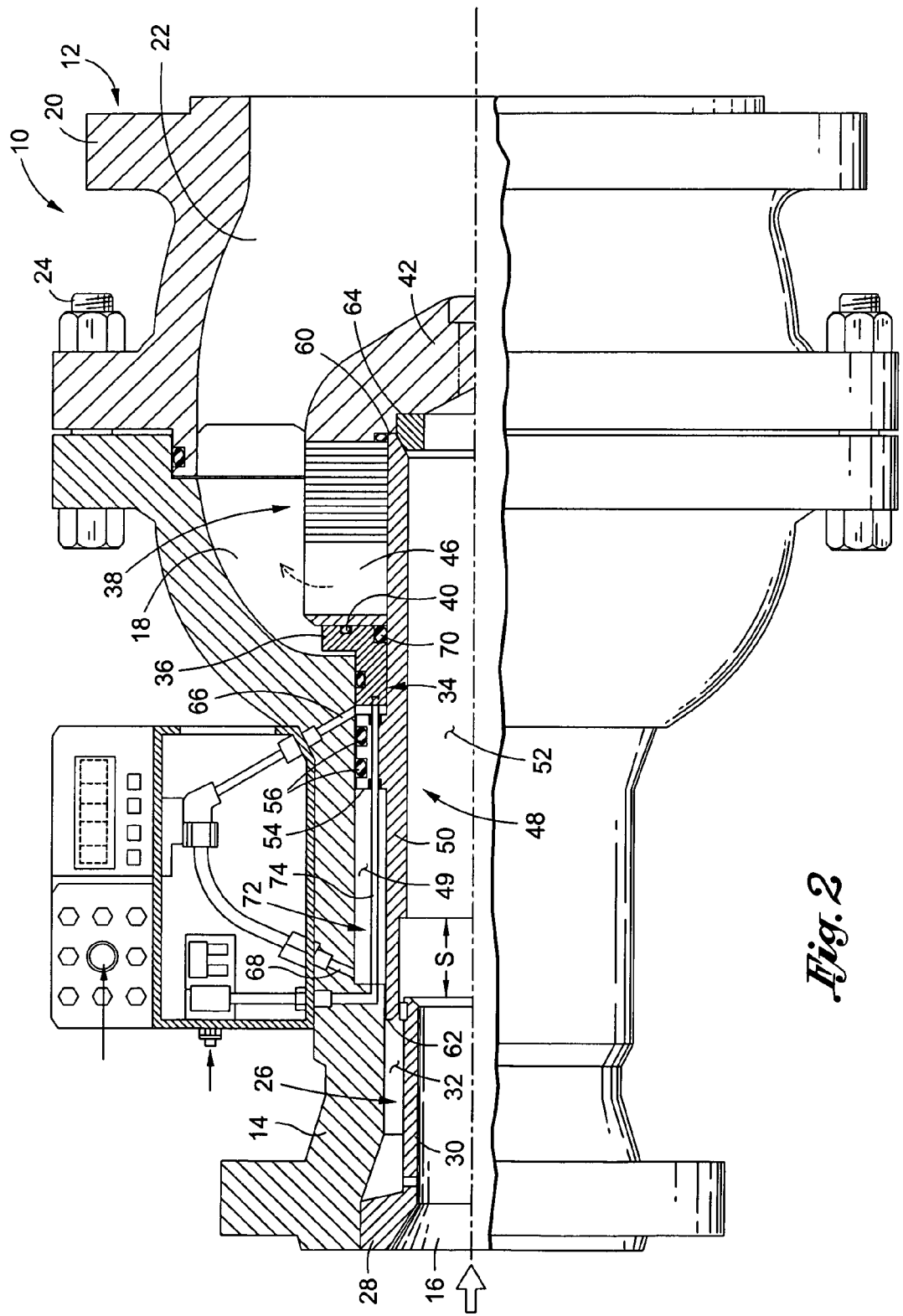
FIG. 2 is a partial cross-sectional view of the axial drag valve of the first embodiment shown in FIG. 1.

Referring now to the drawings wherein the showings are for purposes of illustrating preferred embodiments of the present invention only, and not for purposes of limiting the same, FIGS. 1 and 2 depict an axial drag valve 10 constructed in accordance with a first embodiment of the present invention. More particularly, FIG. 1 is an exploded view of the valve 10, with FIG. 2 being a cross-sectional view thereof. As will be discussed in more detail below, the valve 10 is selectively moveable between a closed position and a fully open position, and is depicted in FIG. 2 in its closed position.

The valve 10 comprises a housing 12. The housing 12 itself comprises an inlet section 14 which defines an inlet passage 16 and an outlet passage region 18. In addition to the inlet section 14, the housing 12 includes an outlet section 20 which itself defines an outlet passage region 22. The outlet passage region 18 and the outlet passage region 22 collectively define an outlet passage of the valve 10 when the inlet and outlet sections 14, 20 are rigidly attached to each other. As seen in FIG. 2, the attachment of the inlet and outlet sections 14, 20 to each other is facilitated by the use of fasteners 24, such as bolts. However, those of ordinary skill in the art will recognize that a wide variety of different attachment methods may be used to effectuate the rigid attachment of the inlet and outlet sections 14, 20 to each other. However, in the valve 10, it is contemplated that any attachment method used to facilitate the attachment of the inlet and outlet sections 14, 20 to each other will be adapted to allow for the periodic separation of the inlet section 14 from the outlet section 20 as may be needed to access the interior of the housing 12 to allow for maintenance on other parts and components of the valve 10 which will be described in more detail below.

As indicated above, the outlet passage of the valve 10 is collectively defined by the outlet passage regions 18, 22. In this regard, the configuration of the outlet passage of the valve 10 is governed, in large measure, by the shapes of the inlet and outlet sections 14, 20. However, those of ordinary skill in the art will recognize that the shapes of the inlet and outlet sections 14, 20, and hence the configuration of the outlet passage as shown in FIG. 2, is exemplary only, and that alternative configurations for the outlet passage are contemplated to be within the spirit and scope of the present invention.

Disposed within the interior of the inlet section 14, and more particularly within the inlet passage 16 defined thereby, is an annular inlet shield 26. The inlet shield 26 includes a base portion 28 which is rigidly attached to the inlet section 14, and more particularly to a portion of the inner surface thereof which defines the inlet passage 16. In addition to the base portion 28, the inlet shield 28 includes a wall portion 30 which is integrally connected to the base portion 28. As seen in FIG. 2, the wall portion 30 extends axially within the inlet passage 16 in spaced relation to the inner surface of the inlet section 14 defining the inlet passage 16. Thus, an annular gap 32 is defined between the wall portion 30 and the inlet section 14.

The valve 10 further comprises an annular guide member 34 which, like the inlet shield 26, is attached to a portion of the inner surface of the inlet section 14. More particularly, as shown in FIG. 2, the guide member 34 is attached to the inner surface of the inlet section 14 proximate the outlet passage region 18 defined thereby. In this regard, the outlet passage region 18 is partially defined by a radially extending flange portion 36 of the guide member 34.

The valve 10 further comprises a generally cylindrical, tubular flow control element 38 which is disposed within the outlet passage region 18 of the inlet section 14. As seen in FIGS. 1 and 2, one end or annular rim defined by the flow control element 38 is abutted against one end of the guide member 34, including the flange portion 36 thereof. In this regard, as seen in FIG. 2, disposed within the flange portion 36 of the guide member 34 is a continuous, annular channel which accommodates a sealing member 40. The sealing member 40 is effectively captured and compressed between the guide member 34 and the corresponding end of the flow control element 38. The opposite, remaining end or annular rim of the flow control element 38 (i.e., the end opposite that abutted against the guide member 34) is itself abutted against an internal end cap 42 of the valve 10. As seen in FIGS. 1 and 2, the end cap 42 is suspended within the interior of the outlet section 20, and more particularly within the outlet passage region 22 defined thereby, the outlet passage region 22 being partially defined by the end cap 42. The end cap 42 may be integrally connected to the outlet section 20 by support struts 44 which extend therebetween in the manner shown in FIG. 1. Though not shown, it is also contemplated that the end cap 42 may be attached to the inlet section 14 of the housing 12 by support bars which extend through the outlet passage region 18. Whether attached to the outlet section 20 and/or the inlet section 14, the end cap 42 is positioned along the axis of the housing 12 so that the flow control element 38 is effectively captured and compressed between the end cap 42 and the guide member 34.

In the valve 10, it is contemplated that the flow control element 38 may comprise a stack of annular discs that collectively define a series of substantially radially directed passageways extending between the inner and outer radial surfaces or edges of the discs. As seen in FIGS. 1 and 2, a series of these radially directed passageways disposed within one end portion of the flow control element 38 may be configured as enlarged flow openings 46 which provide substantially unimpeded flow through the flow control element 38. If the flow openings 46 are provided in the flow control element 38, it is contemplated that the remainder of the radially directed passageways will each be tortuous and define a plurality of turns therewithin in order to reduce the velocity of fluid that is flowing through the flow control element 38. In this regard, the flow control element 38 may alternatively be fabricated to omit the flow openings 46, all the radially directed passageways thus being tortuous. An exemplary flow control element 38 is disclosed in commonly owned U.S. Pat. No. 5,687,763, the disclosure of which is incorporated herein by reference.

The valve 10 further comprises an elongate, tubular piston sleeve 48 which is slidably disposed within the interior of the housing 12, and predominantly within the inlet section 14 thereof. The piston sleeve 48 is selectively moveable between a closed position (shown in FIG. 2) and a fully open position which will be described in more detail below. As shown in FIGS. 1 and 2, the piston sleeve 48 includes a main body portion 50 which defines a flow passage 52 extending axially therethrough. Protruding radially outward from the outer surface of the approximate center of the main body portion 50 is a flange portion 54. The flange portion 54 resides within a piston sleeve chamber 49 of the valve 10 which is collectively defined by a portion of the inner surface of the inlet section 14, a portion of the outer surface of the main body portion 50, and the guide member 34. Disposed within the flange portion 54 is a spaced pair of continuous, circumferential grooves or channels, each of which accommodates a sealing member 56. Additionally, extending laterally through the flange portion 54 is a probe bore 58, the axis of which extends in generally parallel relation to the axis of the flow passage 52. The use of the probe bore 58 will be described in more detail below. In the piston sleeve 48, the opposed end portions of the main body portion 50 each have a beveled or tapered configuration, and extend to respective ones of opposed first and second rims 60, 62 of the main body portion 50.

As indicated above, the piston sleeve 48 is reciprocally moveable within the interior of the housing 12 between closed and fully open positions. When the piston sleeve 48 is in its closed position as shown in FIG. 2, the beveled surface defined thereby and extending to the first rim 60 thereof is abutted and sealed against an annular sealing member 64 which is attached to the end cap 42. When the piston sleeve 48 is sealed against the sealing member 64, the inner ends of each of the fluid passageways defined by the flow control element 38, including the flow openings 46, are effectively covered by the main body portion 50 of the piston sleeve 48, and in particular the section thereof extending between the flange portion 54 and the first rim 60. Additionally, when the piston sleeve 48 is in its closed position, the flange portion 54 is disposed in the piston chamber 49 in close proximity to the guide member 34, but space therefrom by a slight gap. Further, when the piston sleeve 48 is in its closed position, a small section of the main body portion 50 thereof extending to the second rim 62 overlaps the wall portion 30 of the inlet shield 26, thus protruding slightly into the gap 32 defined between the wall section 30 and the inner surface of the inlet section 14.

In the valve 10, fluid initially enters the inlet passage 16 defined by the inlet section 14 of the housing 12. More particularly, the fluid flows through the interior of the inlet shield 26 and into the flow passage 52 defined by the piston sleeve 48. As will be recognized by those of ordinary skill in the art, when the piston sleeve 48 is in its closed position as described above and shown in FIG. 2, fluid flowing through the flow passage 52 is effectively blocked from flowing radially outwardly through the flow control element 38, and thus into the outlet passage collectively defined by the outlet passage regions 18, 22 of the housing 12. Rather, the fluid flow impinges directly against the above-described end cap 42.

Though not shown, when the piston sleeve 48 is moved or actuated to its fully open position, the tapered surface extending to the first rim 60 is moved or withdrawn from its sealed engagement with the sealing member 56, with the retraction of the piston sleeve 48 being continued until such time as the first rim 60 is generally aligned with the flange portion 36 of the guide member 34. When the piston sleeve 48 is in such fully open position, more of the main body portion 50 thereof is advanced into the gap 32 in comparison to when the piston sleeve 48 is in the closed position. In this regard, the segment of the main body portion 50 which is advanced into the gap 32 when the piston sleeve 48 is in its fully open position is identified by the letter "S" shown in FIG. 2. As shown in FIG. 2, one end of the segment S extends to the tapered surface extending to the second rim 62. As the piston sleeve 48 moves between its closed and fully open positions, the inner surface of the segment S is maintained in sliding contact with the outer surface of the wall portion 30 of the inlet shield 26. As will also be recognized by those of ordinary skill in the art, when the piston sleeve 48 is moved from the closed position toward the fully open position, fluid is able to flow through the flow passage 52, and thereafter radially outwardly through the flow control element 38 and into the outlet passage of the valve 10. Since the fluid must flow through the flow control element 38 to reach the outlet passage, the energy of the fluid is effectively reduced due to the above-described functional attributes of the flow control element 38.

The opening of the valve 10 may be effectuated without necessarily actuating the piston sleeve 48 to its fully open position described above. In this regard, in the valve 10, the axial movement of the piston sleeve 48 away from the sealing member 64 may be regulated or controlled depending on the desired level of fluid energy dissipation. Along these lines, as will be recognized, the greater the amount of axial movement of the piston sleeve 48 away from the sealing member 64, the greater the number of energy dissipating fluid passageways of the flow control element 38 that will be exposed to the incoming fluid flow via the flow passage 52. In this regard, maximum energy dissipation of the inlet fluid is achieved when the piston sleeve 48 is moved to its fully open position.

In the valve 10, it is desirable to prevent any rotation of the piston sleeve 48 as it moves between its closed and fully open positions. As indicated above, as the piston sleeve 48 moves between its closed and fully open positions, the inner surface of the segment S is maintained in sliding contact with the outer surface of the wall portion 30 of the inlet shield 26. To assist in preventing rotation of the piston sleeve 48, it is contemplated that the segment S of the main body portion 50 (i.e., that section of the main body portion 50 which overlaps the wall portion 30 of the inlet shield 26 when the piston sleeve 48 is in its fully open position) may be formed or machined to have a polygonal cross-sectional configuration as shown in FIG. 3. As a result of forming the segment S of the main body portion 50 with such polygonal cross-sectional configuration, the interference between the main body portion 50 and the wall portion 30 of the inlet shield 26 as the segment S slides along the outer surface thereof effectively prevents rotation of the piston sleeve 48 relative to the inlet shield 26. However, those of ordinary skill in the art will recognize that the piston sleeve 48 need not necessarily be formed to have a polygonal segment as described above, and that alternative structures may be integrated into the valve 10 to prevent the rotation of the piston sleeve 48.

In the valve 10, the reciprocal axial movement of the piston sleeve 48 as needed to effectuate the movement thereof between its closed and fully open positions is facilitated by the selective application of air pressure to either side of the flange portion 54 of the piston sleeve 48. In this regard, disposed within the inlet section 14 of the housing 12 is a first air passage 66 which, as seen in FIG. 2, communicates with the piston chamber 49 at the gap normally defined between the flange portion 54 and the guide member 34 when the piston sleeve 48 is in its closed position. In addition to the first air passage 66, also formed in the inlet section 14 is a second air passage 68 which also communicates with the piston chamber 49 at a location between the flange portion 54 of the piston sleeve 48 and the inlet passage 16 or inlet shield 26. The first and second air passages 66, 68 are adapted to selectively supply air to, or exhaust air from, the interior of the housing 12 as needed to effectuate the reciprocal axial movement of the piston sleeve 48 therewithin. More particularly, to facilitate the movement of the piston sleeve 48 to the closed position shown in FIG. 2, pressurized air is input into the piston chamber 49 via the second air passage 68, such pressurized air acting against the flange portion 54 in a manner effectively forcing it toward the guide member 34. The movement of the piston sleeve 48 toward the guide member 34 is discontinued as a result of the abutment of the piston sleeve 48 against the sealing member 64. As will be recognized, when the second air passage 68 is pressurized as occurs to facilitate the actuation of the piston sleeve 48 to the closed position, the first air passage 66 acts as an exhaust port so that air captured between the flange portion 54 and the guide member 34 does not impede the movement of the flange portion 54 toward the guide member 34.

Conversely, to facilitate the movement of the piston sleeve 48 to the fully open position, the first air passage 66 is pressurized so as to facilitate the input of air into the piston chamber 49 at gap defined between the flange portion 54 and the guide member 34, such pressurized air acting against the flange portion 54 as results in its movement away from the guide member 34. Such movement of the flange portion 54 effectively draws the main body portion 50 of the piston sleeve 48 away from the sealing members 64. As will be recognized, when the first air passage 66 is pressurized to facilitate the movement of the piston sleeve 48 toward the fully open position, the second air passage 68 effectively functions as an exhaust port so that any air trapped between the flange portion 54 and the inlet section 14 of the housing 12 does not impede the movement of the piston sleeve 48 away from the sealing member 64. Within the piston chamber 49, pressurized air is prevented from migrating between the peripheral edge of the flange portion 54 and the inner surface of the inlet section 14 by the sliding, sealed engagement effectuated by the sealing members 56 disposed within the flange portion 54. Further, as the piston sleeve moved between its closed and fully open positions, fluid is further prevented from migrating between the main body portion 50 of the piston sleeve 48 and the guide member 34 by the sliding seal created by a sealing member 70 disposed within a complimentary annular channel within the guide member 34, as shown in FIG. 2.

In order to monitor and thus tightly regulate or control the position of the piston sleeve 48 relative to the sealing member 64, the valve 10 is preferably provided with a position feedback device 66 which is oriented within the piston chamber, and extends between the first and second air passages 66, 68. More particularly, the feedback device 72 includes an elongate, generally cylindrical probe portion 74, one end of which is attached to the guide member 34, and the other end of which is attached to the inlet section 14. The probe portion 74 extends through the piston chamber 49 in generally parallel relation to the axis of the flow passage 52. The probe portion 74 is further advanced through the complimentary probe bore 58 extending through the flange portion 54 of the piston sleeve 48, thus allowing the flange portion 54 to be selectively slidably advanced along the probe portion 74. In this regard, the movement of the flange portion 54 relative to the probe portion 74 is operative to allow the feedback device 72 to effectively monitor the relative position of the flange portion 54, and hence the piston sleeve 48. Since the probe portion 74 is always advanced through the flange portion 54 throughout the range of movement of the piston sleeve 48 between its closed and fully open positions, the interference between the probe portion 74 and the piston sleeve 48 supplements the anti-rotation effect described above.

Referring now to FIG. 4, in accordance with a first potential variant of the valve 10, the previously described end cap 42 may be substituted with the end cap 76 shown in FIG. 4. The end cap 76 as shown in FIG. 4 is attached to the inlet section 14 of the housing 12 by support bars 78 which extend through the outlet passage region 18. Alternatively, though not shown, the end cap 76, like the above-described end cap 42, may be integrally connected to the outlet section 20 of the housing 12 by support struts similar to the aforementioned support struts 44 shown in FIG. 1. Whether attached to the inlet section 14 and/or the outlet section 20, the end cap 76 is positioned along the axis of the housing 12, and more particularly the axis of the flow passage 52 of the piston sleeve 48, with the flow control element 38 effectively being captured and compressed between the end cap 76 and the guide member 34.

The primary distinction between the end cap 76 and the above-described end cap 42 lies the inclusion of a plurality of flushing holes 80 within the end cap 76. When the piston sleeve 48 is in an open position, one end of each of the flushing holes 80 fluidly communicates with the interior of the flow control element 38, with the opposed, remaining end of each of the flushing holes 80 fluidly communicating with the outlet passage of the valve 10, and in particular the outlet passage region 22 defined by the outlet section 20. As seen in FIG. 4, when the piston sleeve 48 in its closed position, that end of each of the flushing holes 80 otherwise fluidly communicating with the interior of the flow control element 38 is effectively blocked by the first rim 60 of the piston sleeve 48. When the flushing holes 80 are blocked by the piston sleeve 48, the tapered surface of the main body portion 50 extending to the first rim 60 is abutted and sealed against a complimentary tapered surface defined by the end cap 76.

During normal operation of the valve 10 including the end cap 76, when the piston sleeve 48 is in its closed position, fluid flowing through the flow passage 52 is effectively blocked from entering the flow control element 38 by the main body portion 50 of the piston sleeve 48, and is further blocked from directly entering the outlet passage by the end cap 76. However, the fluid flowing through the flow passage 52 and impinging the end cap 76 sometimes has various particles or other contaminants therein which accumulate within the flow passage 52 proximate the end cap 76 as also shown in FIG. 4. As the piston sleeve 48 moves from its closed position toward its open position, the flushing holes 80 are unblocked prior to any of the inner ends of the fluid passageways of the flow control element 38 being unblocked by the continued axial movement of the piston sleeve 48. As a result, fluid is able to flow directly from the flow passage 52, through the flushing holes 80, and into the outlet passage of the housing 12 prior to such fluid flowing through the flow control element 38. The initial flow of fluid through the flushing holes 80 provides an effective flushing feature which causes any contaminant accumulation to be purged directly into the outlet passage rather than being channeled through the flow control element 38. The flushing of the contaminant accumulation is desirable since it could otherwise clog or obstruct the fluid passageways extending through the flow control element 38 due to the typical size and configuration of such fluid passageways.

Referring now to FIGS. 5 and 6, in accordance with a second potential variant of the valve 10, the previously described end cap 42 may be substituted with the end cap 82 shown in FIGS. 5 and 6. The end cap 82 comprises a first section 84 which is attached to the inlet section 14 of the housing 12 by support bars 86 which extend through the outlet passage region 18. Alternatively, though not shown, the first section 84 of the end cap 82 may be integrally connected to the outlet section 20 of the housing 12 by support struts similar to the aforementioned support struts 44 shown in FIG. 1. Whether attached to the inlet section 14 and/or the outlet section 20, the end cap 82 is positioned along the axis of the housing 12, and more particularly the axis of the flow passage 52 of the piston sleeve 48, with the flow control element 38 effectively being captured and compressed between the first section 84 and the guide member 34. In this regard, as seen in FIG. 6, the first section 84 may include a continuous annular groove or channel formed therein which accommodates a sealing member 87, such sealing member 87 creating a fluid tight seal between the first section 84 and the corresponding end of the flow control element 38.

In addition to the first section 84, the end cap 82 comprises a second section 88 which is moveably attached to the first section 84. The second section 88 is selectively moveable between a blocked or closed position (as shown in FIG. 5) whereat the second section 88 is operative to block the flow of fluid from the flow passage 52 to the outlet passage region 22 of the outlet passage when the piston sleeve 48 is in its closed position, and a flushing position (shown in FIG. 6) which effectuates fluid flow from the flow passage 52 directly into the outlet passage region 22 of the outlet passage, thus bypassing the flow control element 38. In the end cap 82, the movement of the second section 88 from its closed position to its flushing position may occur when the piston sleeve 48 acts against the end cap 82 in a manner which will be described in more detail below.

In the end cap 82, the second section 88 is normally biased to its closed position. More particularly, attached to the first section 84 of the end cap 82 is a plurality of support rods 90. One end of each of the support rods 90 is attached (e.g., threadably connected) to the end cap 82. Each of the support rods 90 is slidably advanced through a corresponding, complimentary aperture disposed within a peripheral portion of the second section 88. Attached (e.g., threadably connected) to the end portion of each support rod 90 opposite that connected to the first section 84 is a retention member 92 such as a nut. Captured between each retention member 92 and the peripheral portion of the second section 88 is a biasing member 94 such as a biasing spring. In this regard, each of the support rods 90 extends axially through a respective one of the biasing members 94. As seen in FIG. 5 and as explained above, the biasing members 94 act against the second section 88 in a manner normally biasing the second section 88 to its closed position.

During normal operation of the valve 10 including the end cap 82, when the piston sleeve 48 is in its closed position, fluid flowing through the flow passage 52 is effectively blocked from entering the flow control element 38 by the main body portion of the piston sleeve 48, and is further blocked from directly entering the outlet passage by the second section 88 of the end cap 82 while in its closed position. As indicated above, the fluid flowing through the flow passage 52 and impinging the second section 88 of the end cap 82 sometimes has various particles or other contaminants therein which accumulate within the flow passage 52 proximate the end cap 82. Using the position data regarding the piston sleeve 48 generated by the feedback device 72, the piston sleeve 48 can be manually or automatically moved to a flushing position wherein the piston sleeve 48 moves axially toward the end cap 82 such that the first rim 60 of the piston sleeve contacts and exerts pressure against the distal rim defined by an annular skirt portion of the second section 88 in the manner shown in FIG. 6. The pressure exerted by the piston sleeve 48 against the second section 88 is sufficient to overcome the biasing force exerted by the biasing members 94. As a result, the biasing members 94 are effectively compressed in the manner shown in FIG. 6, thus facilitating the movement of the second section 88 from its closed position to its flushing position.

When the second section 88 moves to its flushing position, fluid is able to pass through a plurality of flow openings 96 disposed in the annular skirt portion of the second section 88 in the manner also shown in FIG. 6. As a result, fluid is able to flow directly from the flow passage 52 into the outlet passage of the housing 12 prior to such fluid flowing through the flow control element 38. In this regard, when the second section 88 is moved to its flushing position by the piston sleeve 48, the inner ends of the fluid passageways of the flow control element 38 are still effectively blocked by the piston sleeve 48. As seen in FIG. 5, the flow openings 96 are covered or blocked by the first section 84 of the end cap 82 when the second section 88 is in its closed position. In this regard, it is only after the second section 88 returns from its flushing position to its blocked position that the piston sleeve 48 moves axially toward its open position, thus unblocking the inner ends of the fluid passageways of the flow control element 38. The initial flow of fluid through the flow openings 96 and directly into the outlet passage provides an effective flushing feature which causes any contaminant accumulation to be purged directly into the outlet passage rather than being channeled through the flow control element 38. As indicated above, the flushing of the contaminant accumulation is desirable since it could otherwise clog or obstruct the fluid passageways of the flow control element 38.

Figure 7:
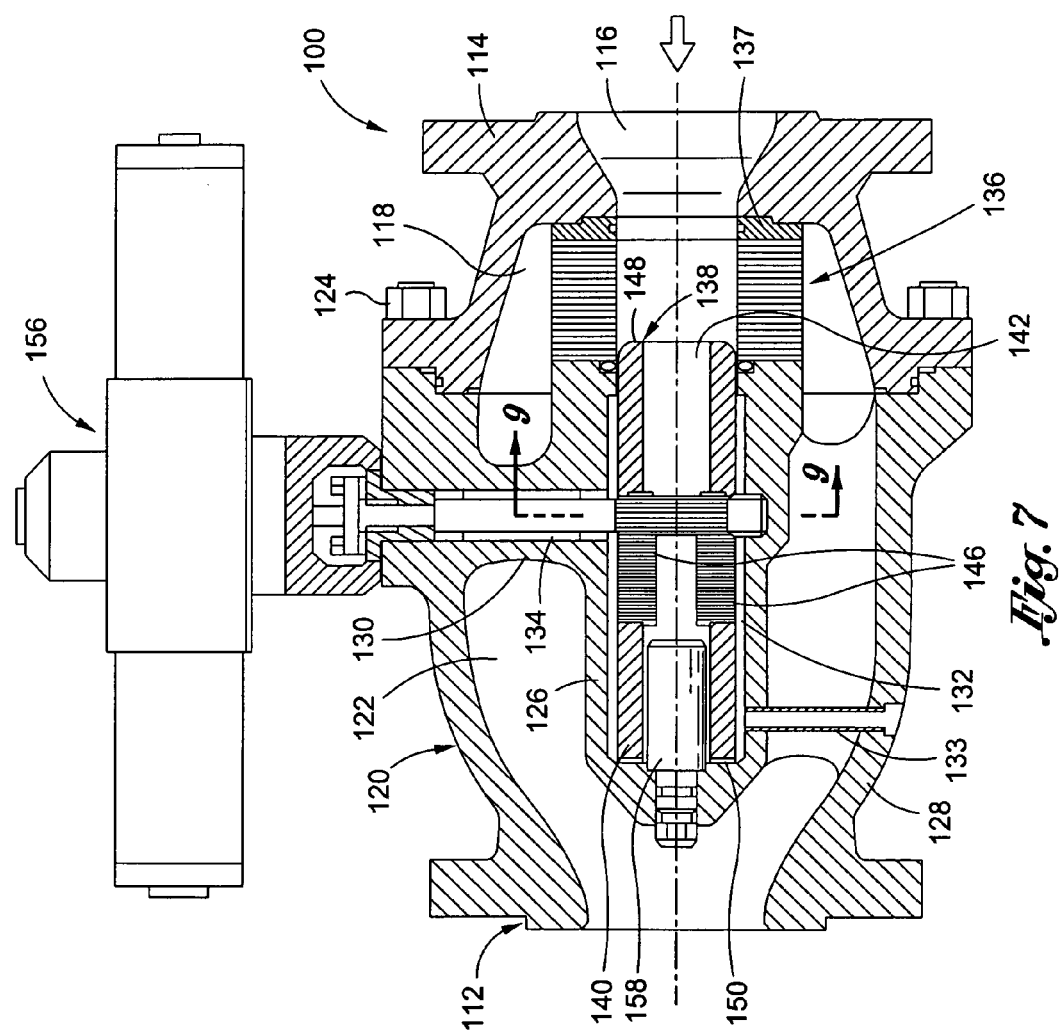
FIG. 7 is a cross-sectional view of an axial drag valve constructed in accordance with a second embodiment of the present invention.
Figure 9:
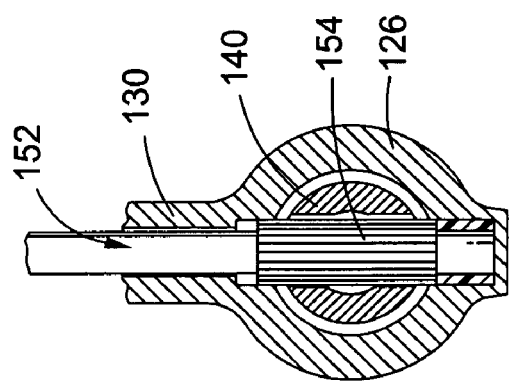
FIG. 9 is a cross-sectional view taken along line 9-9 of FIG. 7.
Figure 8:
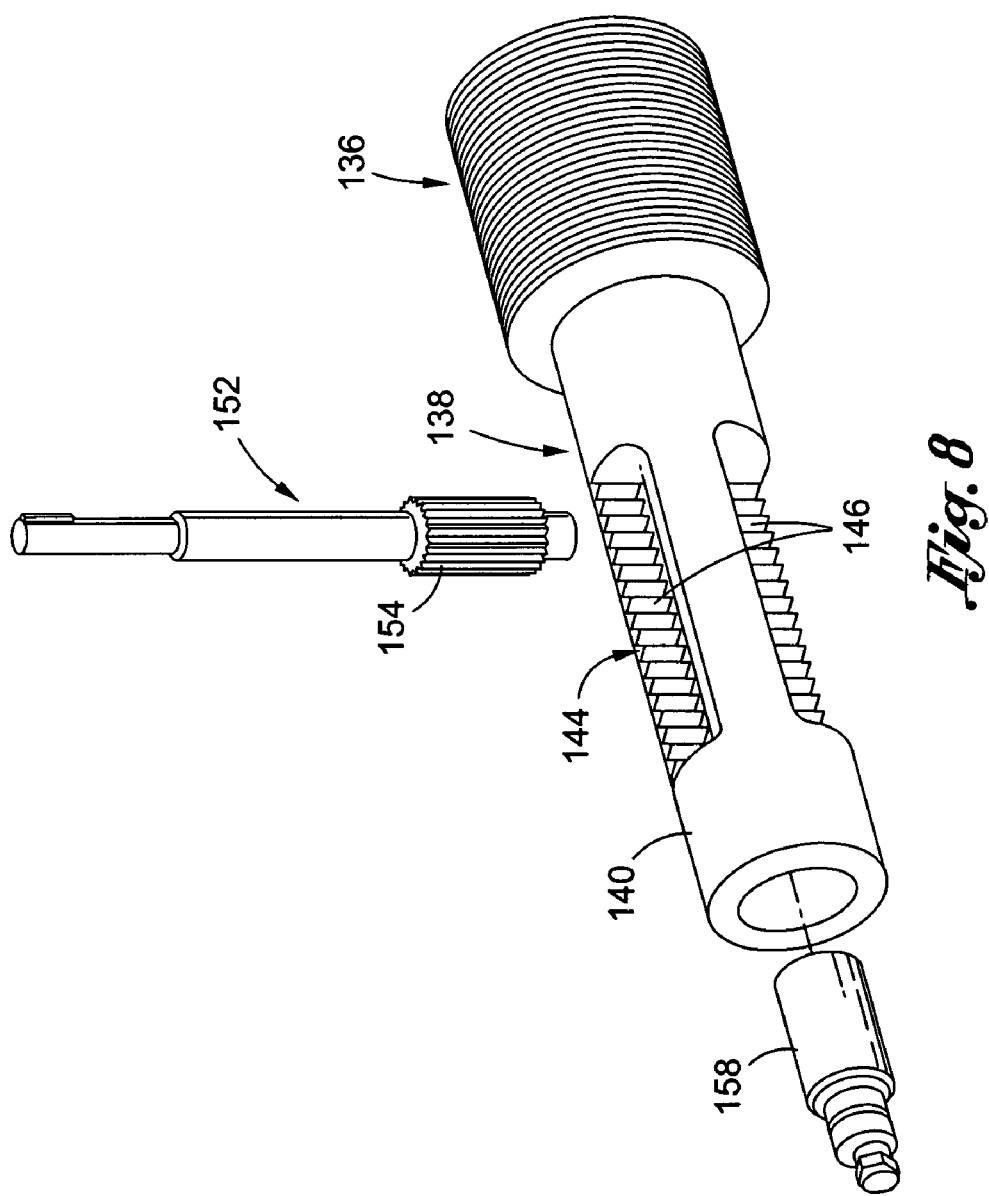
FIG. 8 is a perspective, exploded view of the piston and rack assembly of the axial drag valve of the second embodiment shown in FIG. 7.

Referring now to FIGS. 7-9, there is shown a valve 100 constructed in accordance with a second embodiment of the present invention. The valve 100 comprises a housing 112 having an inlet section 114 which defines an inlet passage 116 and an outlet passage region 118. In addition to the inlet section 114, the housing 112 includes an outlet section 120 which itself defines an outlet passage region 122. The outlet passage region 118 and the outlet passage region 122 collectively define an outlet passage of the valve 100 when the inlet and outlet sections 114, 120 are rigidly attached to each other. As seen in FIG. 7, the attachment of the inlet and outlet sections 114, 120 to each other is facilitated by the use of fasteners 124, such as bolts. However, those of ordinary skill in the art will recognize that a wide variety of different attachment methods may be used to effectuate the rigid attachment of the inlet and outlet sections 114, 120 to each other. However, in the valve 100, it is contemplated that any attachment method used to facilitate the attachment of the inlet and outlet sections 114, 120 to each other will be adapted to allow for the periodic separation of the inlet section 114 from the outlet section 120 as may be needed to access the interior of the housing 112 to allow for maintenance and other parts and components of the valve 100 which will be described in more detail below.

As indicated above, the outlet passage of the valve 100 is collectively defined by the outlet passage regions 118, 122. In this regard, the configuration of the outlet passage of the valve 100 is governed, in large measure, by the shapes of the inlet and outlet sections 114, 120. However, those of ordinary skill in the art will recognize that the shapes of the inlet and outlet sections 114, 120, and hence the configuration of the outlet passage shown in FIG. 7, is exemplary only, and that alternative configurations for the outlet passage are contemplated to be within the spirit and scope of the present invention.

As further seen in FIG. 7, the outlet section 120 includes a piston sleeve portion 126 which is axially suspended within the outlet passage region 122, and is integrally connected to an outer wall portion 128 of the outlet section 120 by a stem portion 130. The piston sleeve portion 126 of the outlet section 120 defines an interior piston chamber 132. The piston chamber 132 communicates with one end of a stem aperture 134 which extends through the stem portion 130 and outer wall portion 128 of the outlet section 120, that end of the stem aperture 134 opposite that communicating with the piston chamber 132 itself communicating with the exterior of the housing 112. As further seen in FIG. 7, the piston sleeve portion 126 is formed such that one end of the piston chamber 132 is enclosed, with the opposite end of the piston chamber 132 facing the inlet passage 116 being open. Fluidly communicating with the piston chamber 132 is one end of a flushing pipe 133, the opposite end of which communicates with the exterior of the outlet section 120 of the housing 112. As seen in FIG. 7, the flushing pipe 133 extends through the outlet passage region 122 of the outlet passage. The use of the flushing pipe 133 will be discussed in more detail below.

The valve 100 further comprises a generally cylindrical, tubular flow control element 136 which is disposed within the outlet passage region 118 of the inlet section 114. As seen in FIG. 7, one end or annular rim defined by the flow control element 136 is abutted against a sealing member 137, which is in turn abutted against the inlet section 114. The opposite, remaining end or annular rim of the flow control element 136 is abutted against the piston sleeve portion 126 of the outlet section 120. Thus, the sealing member 137 is effectively captured and compressed between the inlet section 114 and the flow control element 136. Similarly, the flow control element 136 is effectively captured and compressed between the sealing member 137 and the outlet section 120, while residing within the outlet passage region 118 of the outlet passage of the housing 112. In the valve 100, it is contemplated that the flow control element 136 may comprise a stack of annular discs that collectively define a series of substantially radially directed passageways extending between the inner and outer radial surfaces or edges of the discs. Each of the radially directed passageways has a plurality of turns formed therewithin in order to reduce the velocity of fluid that is flowing through the flow control element 136. An exemplary flow control element 136 is disclosed in commonly owned U.S. Pat. No. 5,687,763 as indicated above.

The valve 100 further comprises an elongate, tubular piston sleeve 138 which is moveably disposed within the interior of the housing 112, and more particularly within the piston chamber 132 defined by the piston sleeve portion 126 thereof. The piston sleeve 138 is selectively movable between a fully open position (shown in FIG. 7) and a closed position which will be described in more detail below. As shown in FIGS. 7-9, the piston sleeve 138 includes a main body portion 140 which defines a flow passage 142 extending axially therethrough. Disposed within the main body portion 140 and extending therethough along an axis which is generally perpendicular to that defined by the flow passage 142 is an elongate opening 144. The walls of the main body portion 140 which collectively define the opening 144 each include a piston rack 146 formed therein. In the piston sleeve 138, the end portion of the main body portion 140 facing the inlet passage 116 has a beveled or tapered configuration, and extends to a first rim 148 of the main body portion 140, the opposite end of the main body portion 140 defining a second rim 150.

As indicated above, the piston sleeve 138 is reciprocally moveable within the piston chamber 132 between closed and fully opened positions. When the piston sleeve 138 is in its closed position, the beveled surface defined thereby and extending to the first rim 148 thereof is abutted and sealed against a complimentary sealing surface defined by the sealing member 137. In this regard, when the piston sleeve 138 is in its closed position, the inner ends of each of the fluid passageways defined by the flow control element 136 are effectively covered by the main body portion 140 of the piston sleeve 138, and in particular the section thereof extending between the opening 144 and the first rim 148.

In the valve 100, fluid initially enters the inlet passage 116 defined by the inlet section 114 of the housing 112. As will be recognized by those of ordinary skill in the art, when the piston sleeve 138 is in its closed position as described above, fluid is able to flow into the flow passage 142 defined by the main body portion 140, despite being effectively blocked from flowing radially outwardly through the flow control element 136, and thus into the outlet passage collectively defined by the outlet passage regions 118, 122 of the housing 112. The fluid flowing through the flow passage 142 is effectively blocked from entering the outlet passage of the housing 112 by the closed end of the piston sleeve portion 126 of the outlet section 120. Any debris accumulating within the piston chamber 132 defined by the piston sleeve portion 126 may be effectively flushed therefrom via the flushing pipe 133.

When the piston sleeve 138 is moved or actuated to its fully open position as shown in FIG. 7, the tapered surface extending to the first rim 148 is moved or withdrawn from its sealed engagement to the sealing member 137, with the retraction of the piston sleeve 138 being continued until such time as the first rim 148 is generally aligned with that end of the flow control element 136 abutted against the piston sleeve portion 126 of the outlet section 120. When the piston sleeve 138 is moved from the closed position toward the fully open position, fluid is able to flow through the inlet passage 116, into the interior of the flow control element 136, and thereafter radially outwardly through the flow control element 136 and into the outlet passage of the valve 100. Since the fluid must flow through the flow control element 136 to reach the outlet passage, and in particular the outlet passage region 118 thereof, the energy of the fluid is effectively reduced due to the above-described functional attributes of the flow control element 136. The opening of the valve 100 may be effectuated without necessarily actuating the piston sleeve 138 to its fully open position as shown in FIG. 7. In this regard, the axial movement of the piston sleeve 138 away from the sealing member 137 may be regulated or controlled depending on the desired level of fluid energy dissipation. Along these lines, as will be recognized, the greater the amount of axial movement of the piston sleeve 138 away from the sealing member 137, the greater the number of energy dissipating fluid passageways of the flow control element 136 that will be exposed to the incoming fluid flow. In this regard, maximum energy dissipation of the inlet fluid is achieved when the piston sleeve 138 is moved to its fully open position.

As further seen in FIGS. 7-9, in the valve 100, the movement or actuation of the piston sleeve 138 between its closed and fully open positions as described above is facilitated by an elongate rotary drive shaft 152. The drive shaft 152 includes an external spline portion 154 which is formed proximate one end thereof. The drive shaft 152 is advanced through the stem aperture 134, with the lower portion of the drive shaft 152 further being advanced through the opening 144 of the main body portion 140. The spline portion 154 of the drive shaft 152 is sized and configured relative to the opening 144 such that the spline portion 154 engages or meshes with the piston racks 146 of the main body portion 140. More particularly, due to the manner of meshed engagement between the spline portion 154 and the piston racks 146, the rotation of the drive shaft 152 in a first, clockwise direction facilitates the movement of the piston sleeve 138 toward its closed position. Conversely, the rotation of the drive shaft 152 in a second, counter-clockwise direction facilitates the movement of the piston sleeve 138 toward its fully open position. The rotation of the drive shaft 152 in either the clockwise or counter-clockwise directions as needed to facilitate the movement of the piston sleeve 138 between its closed and fully open positions may be effectuated by a rotary actuation device 156 which is cooperatively engaged to that end of the drive shaft 152 disposed furthest from the spline portion 154. As seen in FIGS. 7 and 9, the end of the drive shaft 152 disposed closest to the spline portion 154 is preferably rotatably nested within a complimentary recess defined by the piston sleeve portion 126 of the outlet section 120.

During the movement or actuation of the piston sleeve 138 between its closed and open positions by the rotation of the drive shaft 152, it is desirable that the movement of the piston sleeve 138 be constrained to movement along the axis of the flow passage 142. To assist in this movement, it is contemplated that the valve 10 may be outfitted with a guide rod 158 which is shown in FIGS. 7 and 8. The guide rod 158 is attached to the closed end of the piston sleeve portion 126, and protrudes axially into the piston chamber 132 defined thereby. As seen in FIG. 7, a cylindrically configured main body of the guide rod 158 is sized and configured to be slidably received into the flow passage 142, and in particular that portion of the flow passage 152 defined by the segment of the main body portion 140 extending between the piston racks 146 and second rim 150. It is contemplated that some portion of the main body of the guide rod 158 will remain within the flow passage 142 during the full range of movement of the piston sleeve 138 between its closed and fully open positions. Though not shown, it is contemplated that the valve 100 may be outfitted with a feedback device similar to the above-described feedback device 72 for purposes of monitoring the position of the piston sleeve 138 relative to the housing 112.

Figure 10:
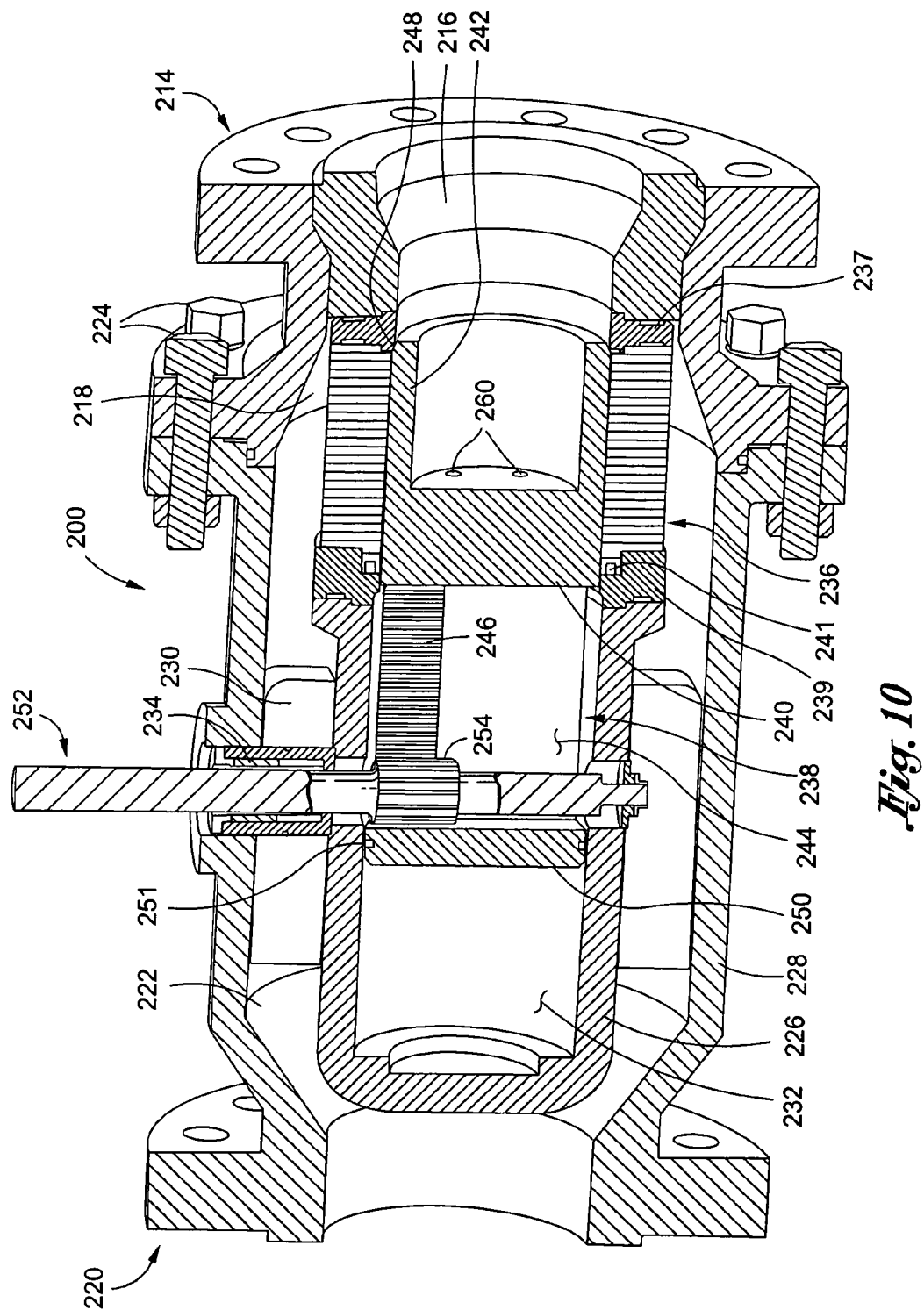
FIG. 10 is a cross-sectional view of an axial drag valve constructed in accordance with a third embodiment of the present invention.

Referring now to FIG. 10, there is shown a valve 200 constructed in accordance with a third embodiment of the present invention. The valve 200 comprises a housing 212 having an inlet section 214 which defines an inlet passage 216 and an outlet passage region 218. In addition to the inlet section 214, the housing 212 includes an outlet section 220 which itself defines an outlet passage region 222. The outlet passage region 218 and the outlet passage region 222 collectively define an outlet passage of the valve 200 when the inlet and outlet sections 214, 220 are rigidly attached to each other. As seen in FIG. 10, the attachment of the inlet and outlet sections 214, 220 to each other is facilitated by the use of fasteners 224, such as bolts. However, those of ordinary skill in the art will recognize that a wide variety of different attachment methods may be used to effectuate the rigid attachment of the inlet and outlet sections 214, 220 to each other. However, in the valve 200, it is contemplated that any attachment method used to facilitate the attachment of the inlet and outlet sections 214, 220 to each other will be adapted to allow for the periodic separation of the inlet section 214 from the outlet section 220 as may be needed to access the interior of the housing 212 to allow for maintenance and other parts and components of the valve 200 which will be described in more detail below.

As indicated above, the outlet passage of the valve 200 is collectively defined by the outlet passage regions 218, 222. In this regard, the configuration of the outlet passage of the valve 200 is governed, in large measure, by the shapes of the inlet and outlet sections 214, 220. However, those of ordinary skill in the art will recognize that the shapes of the inlet and outlet sections 214, 220, and hence the configuration of the outlet passage shown in FIG. 10, is exemplary only, and that alternative configurations for the outlet passage are contemplated to be within the spirit and scope of the present invention.

As further seen in FIG. 10, the outlet section 220 includes a piston sleeve portion 226 which is axially suspended within the outlet passage region 222, and is connected to an outer wall portion 228 of the outlet section 220 by a stem portion 230. The piston sleeve portion 226 of the outlet section 220 defines an interior piston chamber 232. The piston chamber 232 communicates with one end of a stem aperture 234 which extends through the piston sleeve portion 226, the stem portion 230, and the outer wall portion 228 of the outlet section 220, that end of the stem aperture 234 opposite that communicating with the piston chamber 232 itself communicating with the exterior of the housing 212. As further seen in FIG. 10, the piston sleeve portion 226 is formed such that one end of the piston chamber 232 is enclosed, with the opposite end of the piston chamber 232 facing the inlet passage 216 being open.

The valve 200 further comprises a tubular, generally cylindrical flow control element 236 which is disposed within the outlet passage region 218 of the inlet section 214. As seen in FIG. 10, one end or annular rim defined by the flow control element 236 is abutted against a sealing member 237, which is in turn abutted against the inlet section 214. The opposite, remaining end or annular rim of the flow control element 236 is abutted against an adapter ring 239, which is in turn abutted against the piston sleeve portion 226 of the outlet section 120. Thus, the sealing member 237 is effectively captured and compressed between the inlet section 214 and the flow control element 236, with the adapter ring 239 being captured and compressed between the outlet section 220 and the flow control element 236. Similarly, the flow control element 236 is effectively captured and compressed between the sealing member 237 and the adapter ring 239, while residing within the outlet passage region 218 of the outlet passage of the housing 212. Captured between portions of the adapter ring 239 and the flow control element 236 in an annular sealing member 241. In the valve 200, it is contemplated that the flow control element 236 may comprise a stack of annular discs that collectively define a series of substantially radially directed passageways extending between the inner and outer radial surfaces or edges of the discs. Each of the radially directed passageways has a plurality of turns formed therewithin in order to reduce the velocity of fluid that is flowing through the flow control element 236. An exemplary flow control element 236 is disclosed in commonly owned U.S. Pat. No. 5,687,763 as indicated above.

The valve 200 further comprises an elongate, tubular piston sleeve 238 which is moveably disposed within the interior of the housing 212, and more particularly within the piston chamber 232 defined by the piston sleeve portion 226 thereof. The piston sleeve 238 is selectively movable between a closed position (shown in FIG. 10) and a fully open position which will be described in more detail below. The piston sleeve 238 includes a main body portion 240 having an annular skirt portion 242 protruding axially from one end thereof. Disposed within the main body portion 240 and extending therethrough along an axis which is generally perpendicular to that defined by the main body portion 240 is an elongate opening 244. A portion of a wall of the main body portion 240 which partially defines the opening 244 includes a piston rack 246 formed therein. In the piston sleeve 238, the skirt portion 242 defines a beveled or tapered sealing surface 248 adjacent the distal rim thereof. The piston sleeve 238 also defines an end surface 250 which is at the end opposite the distal rim defined by the skirt portion 232. Disposed within the outer surface of the main body portion 240 in close proximity to the end surface 250 is a continuous groove or channel which accommodates a sealing member such as an O-ring 251.

As indicated above, the piston sleeve 238 is reciprocally moveable within the piston chamber 232 between closed and fully open positions. When the piston sleeve 238 is in its closed position, the sealing surface 248 defined by the skirt portion 242 is abutted and sealed against a complimentary sealing surface defined by the sealing member 237. In this regard, when the piston sleeve 238 is in its closed position, the inner ends of each of the fluid passageways defined by the flow control element 236 are effectively covered by the main body portion 240 of the piston sleeve 238, and in particular the section thereof extending between the opening 244 and the sealing surface 248.

The piston sleeve 238 further includes at least one, and preferably a plurality of balance holes 260 formed therein. One end of each of the balance holes 260 extends to that surface of the main body portion 240 circumvented by the skirt portion 242, with the opposite end of each of the balance holes 260 extending to the end surface 250. As will be recognized by those of ordinary skill in the art, the balance holes 260 effectively bypass and thus do not communicate with the opening 244 formed in the main body portion 240.

In the valve 200, fluid initially enters the inlet passage 216 defined by the inlet section 214 of the housing 212. When the piston sleeve 238 is in its closed position as described above, fluid is able to flow into the interior of the skirt portion 242, and through the balance holes 260 into the piston chamber 232, despite being effectively blocked from flowing radially outwardly through the flow control element 236, and thus into the outlet passage collectively defined by the outlet passage regions 218, 222 of the housing 212. The fluid flowing into the interior of the skirt portion 242 is effectively blocked from entering the outlet passage of the housing 212 predominantly by the skirt portion 232 itself.

When the piston sleeve 238 is moved or actuated to its fully open position, the sealing surface 248 defined by the skirt portion 242 is moved or withdrawn from its sealed engagement to the sealing member 237, with the retraction of the piston sleeve 238 being continued until such time as the distal rim of the skirt portion 242 is generally aligned with the sealing member 241. When the piston sleeve 238 is moved from the closed position to the fully open position, fluid is able to flow through the inlet passage 216, and thereafter radially outwardly through the flow control element 236 and into the outlet passage of the valve 200. Since the fluid must flow through the flow control element 236 to reach the outlet passage, and in particular the outlet passage region 218 thereof, the energy of the fluid is effectively reduced due to the above-described functional attributes of the flow control element 236. The opening of the valve 200 may be effectuated without necessarily actuating the piston sleeve 238 to its fully open position. In this regard, the axial movement of the piston sleeve 238 away from the sealing member 237 may be regulated or controlled depending on the desired level of fluid energy dissipation. Along these lines, as will be recognized, the greater the amount of axial movement of the piston sleeve 238 away from the sealing member 237, the greater the number of energy dissipating fluid passageways of the flow control element 236 that will be exposed to the incoming fluid flow. Maximum energy dissipation of the inlet fluid is achieved when the piston sleeve 238 is moved to its fully open position.

As further seen in FIG. 10, in the valve 200, the movement or actuation of the piston sleeve 238 between its closed and fully opened positions as described above is facilitated by an elongate rotary drive shaft 252. The drive shaft 252 includes an external spline portion 254 which is formed on a central portion thereof. The drive shaft 252 is advanced through the stem aperture 234, with the lower portion of the drive shaft 252 further being advanced through the opening 244 of the main body portion 240. The spline portion 254 of the drive shaft 252 is sized and configured relative to the opening 244 such that the spline portion 254 engages or meshes with the piston rack 246 of the main body portion 240. More particularly, due to the manner of meshed engagement between the spline portion 254 and the piston rack 246, the rotation of the drive shaft 252 in a first, clockwise direction facilitates the movement of the piston sleeve 238 toward its closed position. Conversely, the rotation of the drive shaft 252 in a second, counter-clockwise direction facilitates the movement of the piston sleeve 238 toward its fully open position. The rotation of the drive shaft 252 in either the clockwise or counter-clockwise directions as needed to facilitate the movement of the piston sleeve 238 between its closed and fully opened positions may be effectuated by a rotary actuation device (not shown) which is cooperatively engaged to the drive shaft 252. As seen in FIG. 10, the end of the drive shaft 252 disposed closest to the spline portion 254 is preferably rotatably nested within a complimentary recess partially defined by the piston sleeve portion 226 of the outlet section 220. Additionally, a seal assembly or packing is preferably interposed between the drive shaft 252 and that surface of the outlet section 220 defining the stem aperture 234. Though not shown, it is contemplated that the valve 200 may also be outfitted with a feedback device similar to the above-described feedback device 72 for purposes of monitoring the position of the piston sleeve 238 relative to the housing 212.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:
1. A valve, comprising:
a housing defining an inlet passage and an outlet passage;
a flow control element disposed within the housing between the inlet and outlet passages, the flow control element including a plurality of fluid passageways, at least some of which are configured to facilitate energy loss in a fluid flowing therethrough; and
a piston sleeve disposed within the housing and reciprocally moveable between a closed position whereat the piston sleeve is operative to prevent the flow of fluid from the inlet passage to the flow control element, and an open position whereat fluid is able to flow from the inlet passage, through at least a portion of the flow control element, and into the outlet passage, the piston sleeve comprising:
 a tubular main body portion defining a flow passage which fluidly communicates with the inlet passage; and
 a rigid flange portion protruding from and moveable with the main body portion, the flange being configured such that the selective application of fluid pressure to the flange portion is operative to facilitate the movement of the piston sleeve between the closed and open positions.

2. The valve of claim 1 further comprising a feedback device disposed within the housing and operative to monitor the relative position of the piston sleeve.

3. The valve of claim 2 wherein:
the flange portion of piston of the piston sleeve includes a probe bore which extends therethrough; and
the feedback device includes a probe portion which is advanced through the probe bore;
the probe portion remaining within the probe bore during movement of the piston sleeve between the closed and open positions.

4. The valve of claim 1 further comprising an end cap abutted against the flow control element and operative to normally block the flow of fluid from the flow passage to the outlet passage when the piston sleeve is in the closed position.

5. The valve of claim 4 wherein the end cap includes at least one flushing hole disposed therein which is configured to effectuate fluid flow from the flow passage to the outlet passage bypassing the flow control element when the piston sleeve is moved from the closed position toward the open position.

6. The valve of claim 4 wherein the end cap comprises:
a first section abutted against the flow control element; and
a second section moveably attached to the first section and selectively moveable between a closed position whereat the second section is operative to block the flow of fluid from the flow passage to the outlet passage when the piston sleeve is in the closed position, and a flushing position which effectuates fluid flow from the flow passage to the outlet passage bypassing the flow control element when the piston sleeve is in the closed position.

7. The valve of claim 6 wherein the second section is normally biased to the closed position by a biasing member which is attached to the first section and cooperatively engaged to the second section, the biasing member exerting a biasing force against the second section which may be overcome by the application of fluid pressure to the second section at a prescribed level as needed to facilitate the movement of the second section to the flushing position.

8. The valve of claim 7 wherein the biasing member comprises a pair of biasing springs.

9. The valve of claim 4 further comprising a sealing member attached to the end cap, the piston sleeve being abutted against the sealing member when in the closed position.

10. The valve of claim 1 further comprising an inlet shield disposed within the inlet passage of the valve housing, a segment of the main body portion of the piston sleeve slidably contacting the inlet shield during movement of the piston sleeves between the closed and open positions.

11. The valve of claim 10 wherein the segment of the main body portion of the piston sleeve slidably contacting the inlet shield has a polygonal cross-sectional configuration so as to prevent the rotation of the piston sleeve relative to the inlet shield.

12. The valve of claim 1 further comprising a guide member abutted against the flow control element and positioned between the flange portion of the piston sleeve and the flow control element.

13. The valve of claim 12 wherein the guide member includes a sealing member disposed therein which maintains a sliding seal with the main body portion of the piston sleeve during movement thereof between the closed and fully open positions.

14. A valve, comprising:
a housing defining an inlet passage and an outlet passage;
a flow control element disposed within the housing between the inlet and outlet passages, the flow control element including a plurality of fluid passageways, at least some of which are configured to facilitate energy loss in a fluid flowing therethrough;
a piston sleeve disposed within the housing and reciprocally moveable between a closed position whereat the piston sleeve is operative to prevent the flow of fluid from the inlet passage to the flow control element, and an open position whereat fluid is able to flow from the inlet passage, through at least a portion of the flow control element, and into the outlet passage; and
an inlet shield disposed within the inlet passage of the housing, a segment of the piston sleeve slidably contacting the inlet shield during movement of the piston sleeve between the closed and open positions to mitigate rotation of the piston sleeve relative to the inlet shield.

15. The valve of claim 14 wherein the segment of the piston sleeve slidably contacting the inlet shield has a polygonal cross-sectional configuration.

16. A valve, comprising:
a housing defining an inlet passage and an outlet passage;
a flow control element disposed within the housing between the inlet and outlet passages, the flow control element including a plurality of fluid passageways, at least some of which are configured to facilitate energy loss in a fluid flowing therethrough;
a piston sleeve defining an end rim, the piston sleeve being disposed within the housing and reciprocally moveable between a closed position whereat the piston sleeve is operative to prevent the flow of fluid from the inlet passage to the flow control element, and an open position whereat fluid is able to flow from the inlet passage, through at least a portion of the flow control element, and into the outlet passage; and
an end cap abutted against the flow control element and the end rim of the piston sleeve when the piston sleeve is in the closed position, the end cap being operative to normally block the flow of fluid to the outlet passage when the piston sleeve is in the closed position, the end cap including at least one flushing hole disposed therein which is configured to effectuate fluid flow from the inlet passage to the outlet passage bypassing the flow control element when the piston sleeve is moved from the closed position toward the open position.

17. The valve of claim 16 wherein the end cap comprises:
a first section abutted against the flow control element; and
a second section moveably attached to the first section and selectively moveable between a closed position whereat the second section is operative to block the flow of fluid from the inlet passage to the outlet passage when the piston sleeve is in the closed position, and a flushing position which effectuates fluid flow from the inlet passage to the outlet passage bypassing the flow control element when the piston sleeve is in the closed position.

18. The valve of claim 1, wherein the flange portion is integrally formed with the main body portion.

* * * * *